(12) United States Patent
Hidaka et al.

(10) Patent No.: US 6,411,361 B1
(45) Date of Patent: Jun. 25, 2002

(54) PRINTING APPARATUS, IMAGE PICKUP APPARATUS AND PRINTING SYSTEM WITH IMAGE PICKUP FUNCTION

(75) Inventors: Toru Hidaka, Akishima; Akihiro Kubota, Kokubunji; Susumu Kobayashi, Sayama, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/261,331

(22) Filed: Mar. 3, 1999

(30) Foreign Application Priority Data

Mar. 10, 1998 (JP) .......................................... 10-058107

(51) Int. Cl.[7] .......................... G03B 27/52; B41B 15/00
(52) U.S. Cl. .......................... 355/40; 358/1.6; 358/906; 358/909.1
(58) Field of Search .............................. 355/40; 358/1.1, 358/1.2, 1.6, 1.13, 906, 909.1; 400/70, 605; 396/311, 429, 446; 348/64

(56) References Cited

U.S. PATENT DOCUMENTS

| | | | | |
|---|---|---|---|---|
| 5,321,486 A | * | 6/1994 | Nanbu et al. | 399/14 |
| 5,678,000 A | * | 10/1997 | Ohtani | 358/1.2 |
| 5,738,457 A | * | 4/1998 | Ishida et al. | 400/706 |
| 5,816,716 A | * | 10/1998 | Sugiyama | 400/76 |
| 6,024,505 A | * | 2/2000 | Shinohara | 400/605 |
| 6,094,282 A | * | 7/2000 | Hoda et al. | 358/909.1 |
| 6,115,137 A | * | 9/2000 | Ozawa et al. | 358/1.6 |
| 6,160,633 A | * | 12/2000 | Mori | 358/1.5 |

FOREIGN PATENT DOCUMENTS

JP 09-104136 4/1997

* cited by examiner

*Primary Examiner*—Russell Adams
*Assistant Examiner*—Rodney Fuller
(74) *Attorney, Agent, or Firm*—Frishauf, Holtz, Goodman & Chick, P.C.

(57) ABSTRACT

A size sensor detects a standard-size printing medium or a panorama-size printing medium. An image processing section selects image data for an area to be printed from the image data according to the detected size of the printing medium and subjects the image data in the printing area to an image process, such as enlargement, according to the size of the printing medium. A printer prints the processed image data on the printing medium.

10 Claims, 5 Drawing Sheets

PRINTING APPARATUS, IMAGE PICKUP APPARATUS AND PRINTING SYSTEM WITH IMAGE PICKUP FUNCTION

BACKGROUND OF THE INVENTION

This invention relates to a printing apparatus which prints image data recorded in a storage medium, such as a memory, by, for example, a digital still camera, on a printing medium of various sizes, and to an image pickup apparatus and a printing system with an image pickup function.

There have been printing apparatuses suited to print pictures taken by a digital still camera or the like. Such printing apparatuses are designed to enlarge or reduce supplied image data to a suitable size and print the processed image data on a printing medium.

One known technique is to provide a zoom function for an image pickup apparatus, take in image data whose zoom rate has been set manually to a suitable value, and print the data on a printing medium.

With the method of setting the zoom rate manually and taking in the image data, however, to change the zoom rate to the desired one, it is necessary to operate the zoom changing switch manually. The procedure is troublesome.

In a case where the zoom rate has been set erroneously in taking a picture, if the erroneously taken picture were printed on a printing medium, printing could not be done on the printing medium as desired; for example, the image in the desired range could not fit in the width of the printing medium or the image would be printed too small for the width of the printing medium.

To overcome the problems, the apparatus disclosed in, for example, Jpn. Pat. Appln. KOKAI Publication No. 9-104136 compares the size of image data with the size of a printing medium, sets the zoom rate that causes the size of the image data and that of the printing medium to have a specific ratio, activates the zoom function so that the zoom rate may be achieved, enlarges or reduces the image to be picked up at the zoom rate, takes in the resulting image, and prints the read image data on the printing medium.

With this method, however, because the zoom rate is set so that the size of the image data and that of the printing medium may have a specific ratio and then the image data is enlarged or reduced, the result of the printing on the printing medium is nothing short of the enlargement or reduction of the original image data according to the size of the printing medium. When printing is done on, for example, a rectangular printing medium with much more frontage than depth, known as a panorama-size printing medium, the result of the printing is either a picture obtained by just enlarging the original image data sidewise or a picture having no image on both sides of the printing medium.

BRIEF SUMMARY OF THE INVENTION

The object of the present invention is to provide a printing apparatus that is capable of setting an image area to be printed to the shape or size of a printing medium in the image data supplied from an image pickup apparatus or other image data generators, and that is capable of then printing the image area to the size of the printing medium. In addition, it is also an object of the present invention to provide an image pickup apparatus and a printing system with an image pickup function.

According to the present invention, there is provided a printing apparatus comprising: a size discriminating section for discriminating between the sizes of printing mediums; an image processing section for setting image data for a printing image area in the image data supplied from an image data generator according to the size of the printing medium discriminated by the size discriminating section and subjecting the image data in the image area to an image process according to the size of the printing medium; and a printing section for printing the image data subjected to the image process at the image processing section on the printing medium.

According to the invention, there is provided an image pickup apparatus comprising: an image pickup section; and an image processing section for receiving information on the size of a printing medium discriminated by a printing apparatus, setting an area corresponding to the size of the printing medium in an image corresponding to the image data obtained by the image pickup section, subjecting the image data in the set area to an image process according to the size of the printing medium, and sending the image data subjected to the image process to the printing apparatus.

According to the invention, there is provided a printing apparatus comprising: a printing section for receiving the processed image data from an image pickup section after the image pickup apparatus has set a printing area in the image data and/or subjected the image data to an image process according to the result of the discrimination supplied from a size discriminating section, and printing the image data on the printing medium.

According to the invention, there is provided a printing system with an image pickup function comprising: an image pickup section; a size discriminating section for discriminating between the sizes of printing mediums; an image processing section for selecting an area to be printed according to the size of the printing medium discriminated by the size discriminating section from the image corresponding to the image obtained from the image pickup section and subjecting the image data in the set area to an image process according to the size of the printing medium; and a printing section for printing the image data subjected to the image process at the image processing section on the printing medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, an embodiment of the present invention will be explained.

Figure 1:
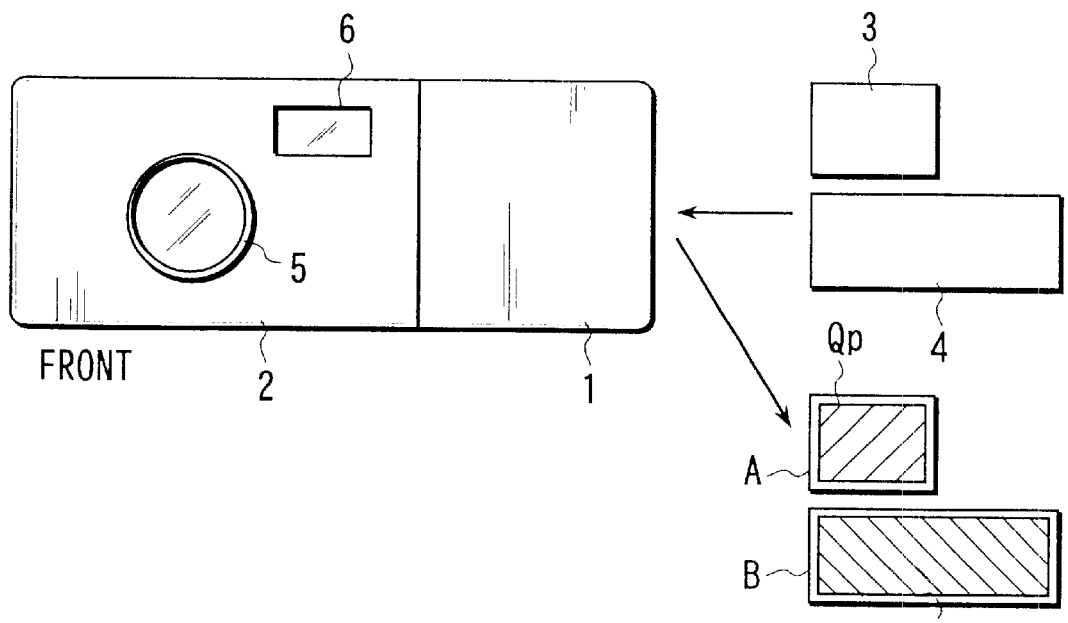
FIG. 1 is a schematic front view of a printing system with an image pickup function according to a first embodiment of the present invention.
Figure 2:
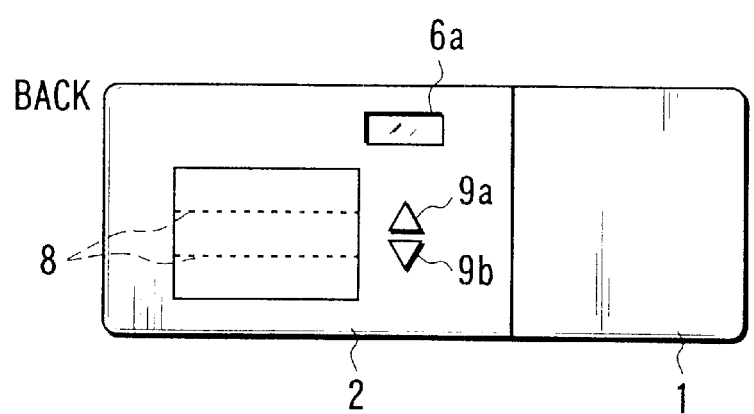
FIG. 2 is a schematic rear view of the printing system.

As shown in FIG. 1, a printer 1 acting as a printing unit is provided with a digital still camera 2 functioning as both an image pickup unit and an image generator. A standard cassette 3 for housing printing mediums of standard size A (actual size=28×21, and aspect ratio=4:3) and a panorama cassette 4 for housing printing mediums of panorama size B (actual size=56×21 mm, and aspect ratio=8:3) can be selectively loaded in the printer 1.

A lens system 5 and a finder 6 are provided on the front of the digital still camera 2. Provided at the back of the camera 2 are a liquid-crystal display 7, operation switches 9a, 9b for moving the position of each reference line 8 to specify the panorama area on an image appearing on the screen of the liquid-crystal display 7, and a viewing window 6a of a finder 6.

Figure 3:
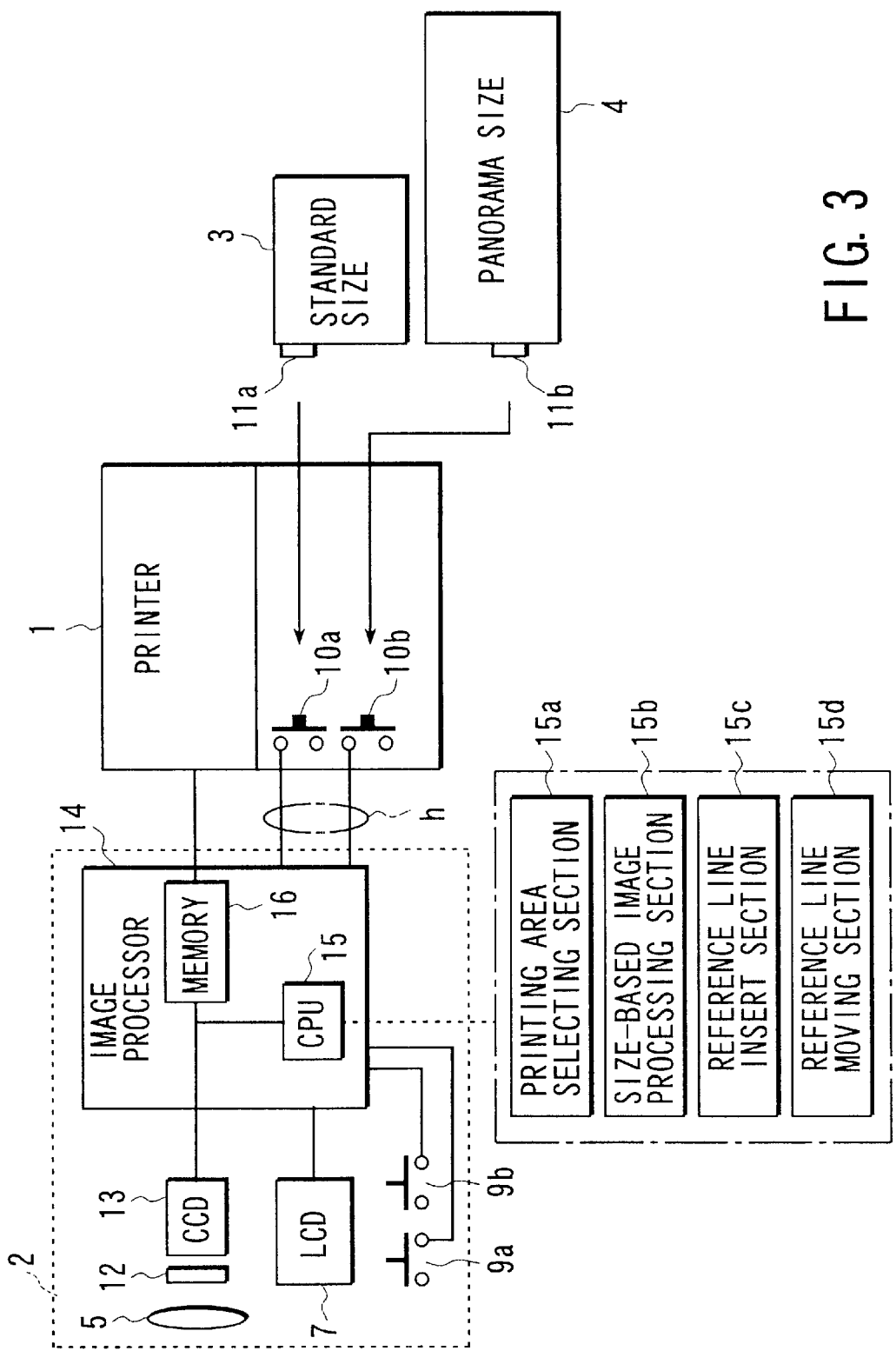
FIG. 3 is a functional block diagram of the printing system.

The configuration of the printer 1 in the printing system of the invention will be explained by reference to FIG. 3. The printer 1 includes discrimination sensors 10a, 10b having the size discriminating function of discriminating between the standard cassette 3 for housing printing mediums of standard size A and the panorama cassette 4 for housing printing mediums of panorama size B.

Specifically, size discriminating projections 11a, 11b are formed on the outer frames of the standard cassette 3 and panorama cassette 4. Each of the discrimination sensors 10a, 10b senses the corresponding projection of the cassette 3 or 4 when either the standard cassette 3 or panorama cassette 4 is selectively installed in the printer 1. On the basis of the corresponding projection 11a or 11b, the sensor determines which cassette (3 or 4) has been installed and generates a discrimination signal h.

In the digital still camera 2, a solid-state image sensor, such as a CCD (charge-coupled device) 13, is provided via a color filter 12 on the optical axis of the lens system 5.

The CCD 13 has the function of picking up the image of a subject via the lens system 5 and color filter 12 and sending the resulting image signal to an image processor 14.

The image processor 14 takes in the image signal from the CCD 13 and subjects the image signal to an image process according to the size A or B of printing medium on the basis of the discrimination signal h sent from the printer 1. Then, the processor 14 sends the image data obtained from the image process to the liquid-crystal display 7 and the printer 1.

Specifically, the image processor 14 includes a CPU (central processing unit) 15 and a memory 16 that exchange data with the CPU. The image signal sent from the CCD 13 is stored in the memory 16 in the form of image data. The image data subjected to image processing by the CPU 15 is also stored in the memory 16.

The CPU 15 functions as a printing area selecting section 15a which receives the discrimination signal h from each of the discrimination switches 10a, 10b and selects image data for the printing area from the image data according to size A or B of the printing medium.

Figure 4:
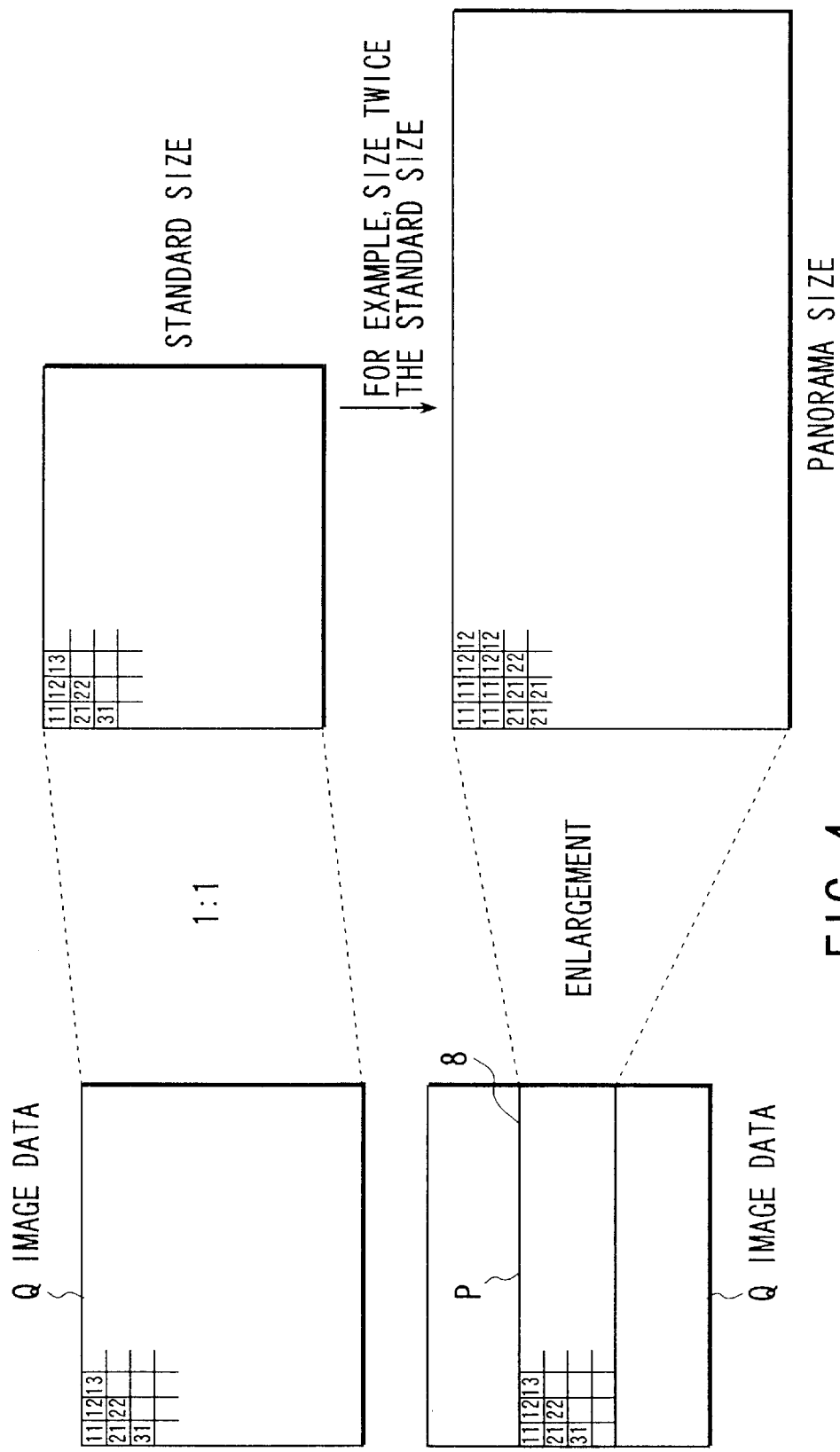
FIG. 4 diagrammatically illustrates standard-size and panorama-size image processing in the printing system.

For example, the CPU 15 has the function of setting all the image data for the standard-size printing image area in printing image data Q on a printing medium of standard size A as shown in FIG. 4 and setting image data P for the panorama-size printing image area in printing on a printing medium of panorama size B.

The CPU 15 further functions as a size-based image processing section 15b which sends all the pixels of image data Q in the ratio of 1:1 to the printer 1 in printing on a printing medium of standard size A as shown in FIG. 4 and, when printing on a printing medium of panorama size B, enlarges image data Q and sends the enlarged image data to the printer 1.

Figure 5:
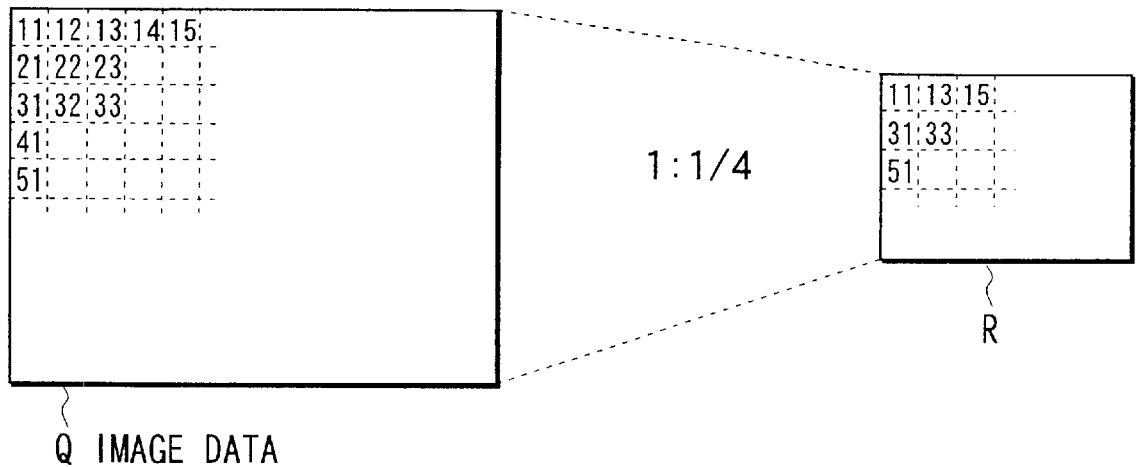
FIG. 5 diagrammatically illustrates the image process of reduced size in the printing system.

The size-based image processing section 15b has the function of reducing image data Q to, for example, one-fourth of standard size A as shown in FIG. 5 in printing on a printing medium smaller than that of standard size A and sending the reduced image data to the printer 1.

Figure 6:
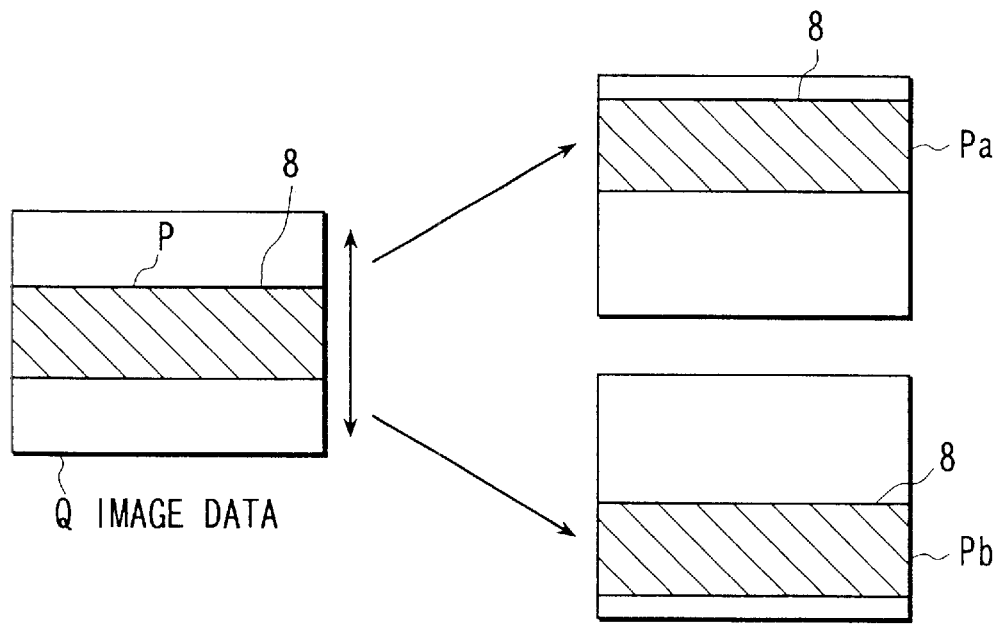
FIG. 6 diagrammatically illustrates the movement of a panorama-size image area in the printing system.

The CPU 15 further functions as a reference line insert section 15c which adds, to image data Q reference lines 8 to set image data P (FIG. 4) for a panorama-size printing area and causes the lines to appear on the screen of the liquid-crystal display 7 and a reference line moving section 15d which receives the operation signals from the operation switches 9a, 9b and moves the position of the reference lines 8 on image data Q according to the operation of the switches 9a, 9b as shown in FIG. 6 to move image data P for the panorama-size printing area.

The operation of the printing system constructed as described above will be explained.

The CCD 13 picks up the image of a subject via the lens system 5 and color filter 12 and sends the obtained image signal to the image processor 14. The image processor 14 takes in the image signal from the CCD 13 and stores the image signal in the memory in the form of, for example, image data Q shown in FIG. 4.

When either the standard cassette 3 or the panorama cassette 4 is installed in the printer 1, the discrimination sensors 10a, 10b determines which cassette (3 or 4) has been installed, from the projection 11a or 11b of the standard cassette 3 or panorama cassette 4 and generates a discrimination signal h.

Receiving the discrimination signal h from either the discrimination switch 10a or 10b, the CPU 15 of the image processor 14 determines whether the printing medium is size A or size B, selects image data for the printing image area from the image data according to size A or B of the printing medium, and sends the image data to the printer 1.

For example, when printing is done on a printing medium of standard size A, the CPU 15 sets all the pixels [11] [12] [13] . . . [21] . . . [31] . . . of image data Q in a 1:1 ratio for the standard-size image area of the subject to be printed as shown in FIG. 4 and sends the image data Q to the printer 1.

When printing is done on a printing medium of panorama-size B, the CPU 15 selects image data P for the panorama-size image area of the subject to be printed from image data Q as shown in FIG. 4, performs the enlarging process by reading the same pixels more than once in such a manner that the individual pixels [11] [12] [13] . . . [21] . . . [31] . . . of image data P are up-sampled to [11] [11] [12] [12] [13] [13] . . . [21] [21] . . . [31] [31] . . . , to enlarge the image and sends the resulting image data to the printer 1. When receiving the image data Q or P from the image processor 14, the printer 1 prints the image data Q or P on a printing medium of standard size A or panorama size B. The results $Q_p$ and $P_p$ of printing on a printing medium of standard size A and that of panorama size B are illustrated diagrammatically in FIG. 1.

The CPU 15 receives the discrimination signal h from either the discrimination switch 10a or 10b and determines the size of the printing medium. If the size of the printing medium is smaller than standard size A, the CPU 15 will reduce image data Q to, for example, one-fourth of standard size A as shown in FIG. 5 to create image data R, and send it to the printer 1.

The image is reduced by down-sampling (skipping) pixels [12] [14] [21] . . . from the pixels [11] [12] [13] . . . [21] . . . [31] . . . of image data Q.

Receiving image data R from the image processor 14, the printer 1 prints the image data R on a printing medium whose size is smaller than standard size A.

In the embodiment, the position at which the reference lines 8 appear on the image displayed on the screen of the liquid-crystal display 7 can be moved arbitrarily. To do this, in response to the operation of the switches 9a, 9b, the CPU 15 moves the position of the image data corresponding to the position of the reference lines 8 in relative relation to the image data Q as shown in FIG. 6. The reference lines 8 indicate the panorama-size image area for the subject to be printed.

When printing is done on a printing medium of panorama size B, the CPU 15 of the image processor 14 sets image data for the panorama-size image area of the subject to be printed, for example, image data Pat on the basis of the position of the reference lines 8 moved in response to the operation signal from the operation switches 9a, 9b. The CPU 15 then reads each pixel of image data Pa more than once for enlargement as described above and sends the resulting image data to the printer 1. Receiving the image data from the image processor 14, the printer 1 prints the image data on a printing medium of panorama size B.

Figure 7:
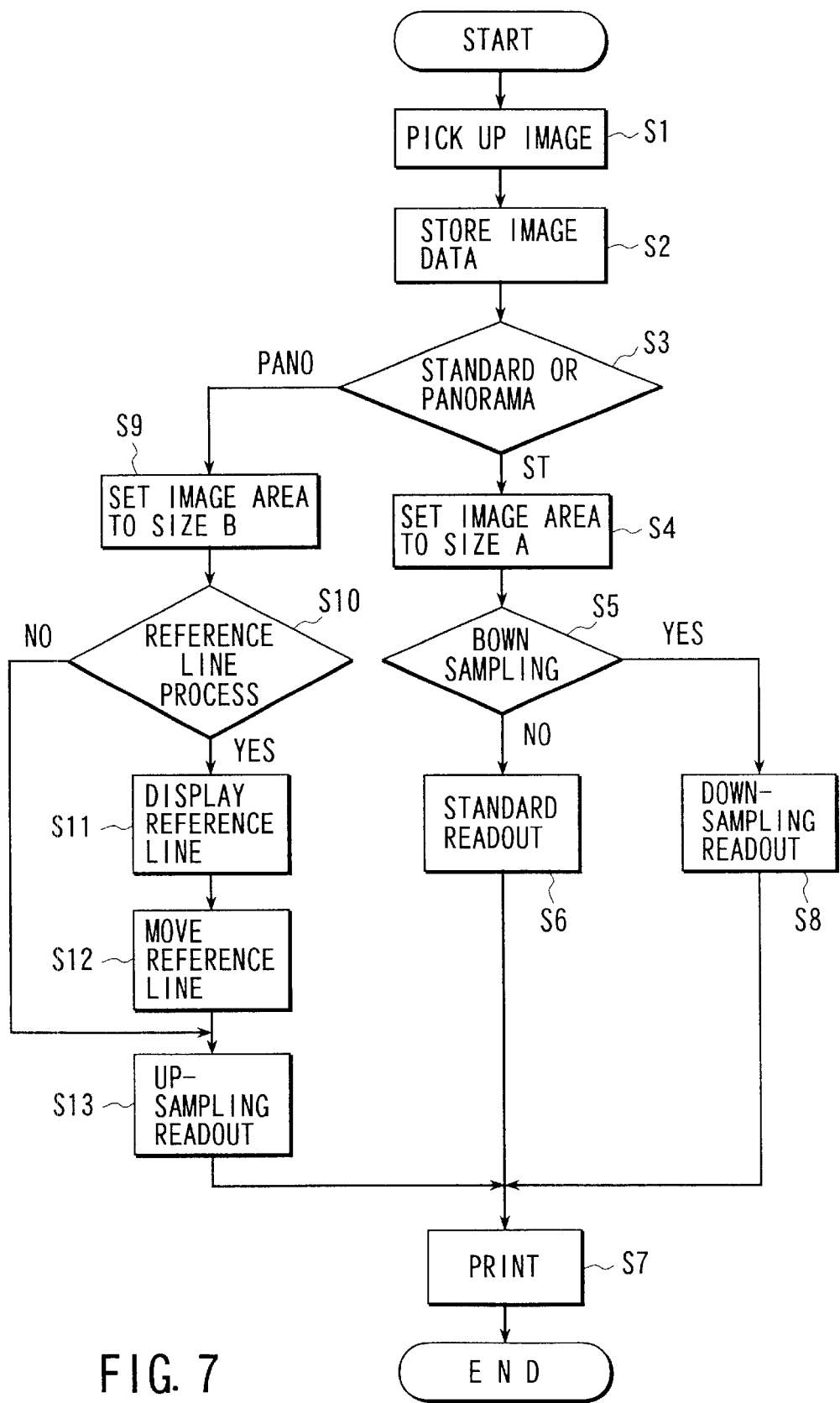
FIG. 7 is a flowchart for the operation of the printing system.

The operation of the printing system of the invention will be described in detail by reference to a flowchart in FIG. 7.

First, the camera 2 picks up an image of a subject (S1). The image signal obtained from the camera is stored in the memory 16 (S2).

Next, the printing mode is determined on the basis of a cassette installed in the printer 1. Specifically, from the output of the sensor 10a or 10b, the CPU 15 determines whether the printing mode is standard or panorama (S3) or performs a printing area selecting process. After the printing area selecting process, the size-based image processing is done as follows.

Specifically, if it has been determined at step 3 that the printing mode is standard, the CPU 15 will set the image area to standard size A (S4). Thereafter, it is determined whether the printing mode is reduction (S5). If it is not reduction, the CPU 15 will read the image data into the memory 16 in the standard mode, that is, read the image data into the memory in a 1:1 ratio as shown in FIG. 4 (S6). The read image data is sent to the printer 1 and printed in standard size on a printing medium in the standard cassette 3 (S7).

If it has been determined at step S5 that the printing mode is reduction, the CPU 15 performs down-sampling readout, that is, down-samples the data as shown in FIG. 5 (S8). The down sampled image data is sent to the printer 1, which prints it on the printing medium to produce a reduced image (S7).

If it has been determined at step S3 that the printing mode is panorama, the CPU 15 set the image area to panorama size B (S9). At step S10, it is determined whether the reference line insert process should be carried out. If it has been determined that the insert process should be carried out, the reference lines will be inserted in the image. At this time, the reference liens 8 will be displayed together with the image on the liquid-crystal display 7 (S11). In this state, to perform the reference line moving process, the user operates the operation switches 9a, 9b, while looking at the reference lines 8 appearing on the liquid-crystal display 7, thereby moving the reference lines 8 as shown in FIG. 6 (S12). Once the position of the reference lines 8 has been set, the CPU 15 performs up-sampling readout, that is, reads each pixel twice as shown in FIG. 4 (S13). The up-sampled image data is sent to the printer 1, which prints it (S7).

If it has been determined at step S10 that the reference line insert process should not be performed, the process is advanced to step S13, and the up-sampling readout is performed. Thereafter, printing is effected.

As described above, with the embodiment, a distinction is made between a printing medium of standard size A and that of panorama size B. On the basis of the distinguished printing medium of size A or B, the image data for the printing image area is set in image data Q. The image data for the printing image area is processed (e.g., enlarged) according to size A or B of the printing medium. The printer 1 prints the processed image data on the printing medium. This makes it possible to set a printing image area in the image data, according to the shape or size of a standard, panorama, or substandard printing medium, and print the image area according to the size of the printing medium.

As a result, even when the standard-size cassette 3 has been replaced with the panorama-size cassette 4 or vice versa, printing is done automatically on the standard-size or panorama-size printing medium without taking the trouble to change the settings of the printing medium.

Furthermore, for example, in panorama-size printing, the result of printing on a printing medium is a true panorama-size print, not a print obtained by just enlarging the original image data Q sidewise or by leaving the image in the middle with both sides of the printing medium having no image.

Furthermore, in panorama-size printing, the user can set a panorama-size printing image area at will by operating the operation switches 9a, 9b. For example, in a picture where plural persons are standing side by side, to print only their faces in the panorama size, the user has only to operate the operation switches 9a, 9b to move the reference lines 8.

When the printing medium is smaller than the printing size of the printer 1 and image data Q cannot be printed in a 1:1 ratio, the down-sampling of image data Q enables printing to be done according to the printing capability of the printer 1 (or in a size suitable for the printing medium).

The present invention is not limited to the above embodiment and may be modified as follows.

For example, the cassette-size discrimination sensors are not restricted to a combination of projections and contacts and may be devices for discriminating between bar codes or between other coded patterns, or other suitable optical, electrical, or mechanical devices. In the means for specifying a panorama-size area, a scope may be provided within the finder 6 in place of the reference lines 8 and the image data in the scope may be printed on a panorama-size printing medium B. It goes without saying that various modifications may be made according to not only panorama size but also various specifications of a camera, printer, or cassette.

This enables the user to select the printing area at will by setting the image of the subject in the scope in taking a picture with a digital still camera 2.

The panorama-size area in the reference lines 8 on the liquid-crystal display 7 may be highlighted in place of the reference lines 8 by making the area brighter than its surroundings. While in the embodiment, the image data has been down-sampled when the size of the printing medium is smaller than the standard size, the data in the area corresponding to the size may be extracted and printed.

While in the embodiment, the printer 1 has been provided with the digital still camera 2 and the digital camera 2 has been used as an image data generator, the present invention is not limited to this. For instance, an external data storage device with a relatively large capacity may be used as an image data generator. Furthermore, a floppy disk or an optical disk may be used in place of the memory 16. After the image data stored on the disk has been subjected to an image process according to the size of a printing medium, the resulting image data may be sent to the printer 1.

As described above in detail, with the present invention, it is possible to provide a printing apparatus capable of setting a printing image area in the image data according to the shape or size of a printing medium and printing the image area to the size of the printing medium.

According to the present invention, there is provided a printing apparatus capable of selecting a desired printing image area according to the shape or size of a printing medium.

According to the present invention, there is provided a printing apparatus capable of moving the printing image area in the image data to an arbitrary position by operating aft operation unit according the shape or size of a printing medium.

Moreover, with the present invention, it is possible to provide a n image pickup apparatus capable of setting an image area in the image data according to the shape or size of a printing medium and sending the image data in the image area to a printing apparatus.

Furthermore, with the invention, it is possible to provide a printing apparatus capable of informing an image pickup apparatus of the shape or size of a printing medium, receiving the image data corresponding to the shape or size of the printing medium, and printing the received image data.

Still furthermore, with the invention, it is possible to provide a printing apparatus capable of setting a printing image are a in the image data according to the shape or size of a printing medium and printing the image area to the size of the printing medium, an image pickup apparatus and a printing system with an image pickup function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printing apparatus in which a printing medium is loaded, comprising:

image generating means for generating source image data;

display means for displaying the source image data;

size detection means for detecting a size of the printing medium;

image processing means including printing area selecting means for selecting print image data of a printing image area corresponding to the size of the printing medium from the source image data according to the size of the printing medium, and means for selectively subjecting the print image data to an image process to generate processed print image data;

printing means for printing the processed print image data on said printing medium; and operation means for manually specifying a position of the printing image area on said display means.

2. A printing apparatus according to claim 1, wherein said operation means includes reference line insertion means for inserting reference lines for indicating the printing image area in the source image data, and means for moving said reference lines to an arbitrary position on a screen of said display means.

3. An image pickup apparatus associated with a printing apparatus in which a printing medium is loaded, comprising:

image pickup means for generating image data;

image processing means for receiving information on a size of said printing medium from said printing apparatus, setting a printing area corresponding to the size of said printing medium in an image corresponding to the image data, subjecting the image data in the printing area to an image process according to the size of said printing medium, and sending the image data subjected to the image process to said printing apparatus; and printing area selecting means for selecting the printing area from the image corresponding to the image data generated by said image pickup means.

4. A printing system with an image pickup function comprising:

image pickup means for generating image data;

size detection means for detecting a size of a printing medium;

image processing means including means for selecting a printing area corresponding to the size of said printing medium from an image corresponding to the image data, and means for subjecting the image data in the printing area to an image process according to the size of said printing medium; and printing means for printing the image data subjected to the image process on said printing medium.

5. A printing apparatus in which a printing medium is loaded, comprising:

an image data supplying section which generates image data;

a size detection section which detects a size of the printing medium, said size detection section including a size discriminating unit which discriminates between a standard-size cassette receiving a standard-size printing medium and a panorama-size cassette receiving a panorama-size printing medium;

an image processing section which sets an image printing area in said image data according to the size of the printing medium, and subjects the image data in the image printing area to a specific process according to the, size of said printing medium to create print image data, said image processing section including a storage section which stores the image data generated by said image data supplying section, and a reading section which selectively operates in a standard-size readout mode and an enlargement readout mode according to a discrimination result of said size discriminating unit to read out the image data from said storage section in a standard size or an enlargement size; and a printing section, said reading section sending the image data read out from said storage section to said printing section as the print image data, said printing section printing the print image data on said printing medium.

6. A printing apparatus according to claim 5, wherein said reading section, in the standard-size readout mode, down-samples the read out image data to produce reduced image data.

7. A printing apparatus according to claim 5, wherein:

said reading section, in the standard-size readout mode, selectively performs a first readout operation of continuously reading out pixels of the image data from said storage section to produce standard-size printing image data and a second readout operation of reading out the pixels of the image data from said storage section in a down-sampling manner from said storage section to produce reduced printing image data, and said reading section selectively sends the standard-size printing image data and the reduced printing image data to said printing section.

8. A printing apparatus according to claim 5, wherein said reading section, in the enlargement readout mode, reads pixels of the image data from said storage section more than once for each pixel to produce enlarged image data and sends the enlarged image data to said printing section.

9. A printing system with an image pickup function comprising:

an image pickup unit which generates image data corresponding to a subject; and a printing unit detachably mounted on said image pickup unit which prints the image data generated by said image pickup unit on a printing medium, wherein said printing unit includes a size detection section which detects a size of the printing medium, and said image pickup unit sets an image printing area in the image data according to the size of said printing medium and subjects the image data in the image printing area to an image process according to the size of said printing medium.

10. A printing apparatus according to claim 9, wherein:

said size detection section includes a sensor unit which selectively detects a standard-size cassette receiving a standard-size printing medium and a panorama-size cassette receiving a panorama-size printing medium, and said image processing section includes a storage section which stores the image data generated by said image data supplying section, and a reading section which selectively operates in a standard size reading mode and an enlargement reading mode according to a detection result of said size detection section to read out the image data from said storage section in a standard size or an enlargement size, and said reading section sends the image data read out from said storage section to said printing section.

* * * * *